United States Patent [19]

Daines

[11] Patent Number: 5,425,516

[45] Date of Patent: Jun. 20, 1995

[54] AIRCRAFT PASSENGER ACCOMODATION SYSTEM

[76] Inventor: Paul H. Daines, Old Mill Rd., Montpelier, Id. 83254

[21] Appl. No.: 269,753

[22] Filed: Jul. 1, 1994

[51] Int. Cl.⁶ .............................................. B64D 11/06
[52] U.S. Cl. .................................. 244/118.6; 105/316
[58] Field of Search .................... 244/118.5, 118.6; 105/315, 316, 322

[56] References Cited

U.S. PATENT DOCUMENTS

| | | | |
|---|---|---|---|
| 2,599,606 | 6/1952 | Burgess | 105/315 |
| 2,600,706 | 6/1952 | Tully et al. | 105/315 |
| 2,608,366 | 8/1952 | Jergenson | 105/315 |
| 2,808,787 | 10/1957 | Murphy | 105/315 |
| 2,884,873 | 5/1959 | Candlin | 105/315 |
| 2,953,103 | 9/1960 | Bohannon et al. | 244/118.6 |
| 2,983,230 | 5/1961 | Murphy | 105/315 |

*Primary Examiner*—Galen L. Barefoot

[57] ABSTRACT

An aircraft passenger accomodation system providing rows of side-by-side seat assemblies for passengers, with the seats operable to provide alternating rows of elevated partially reclining seats and alternate rows of fully reclining seats to provide lounges or beds for some of the passengers and with access to each of the seats regardless of the status of the seat and its location in the aircraft.

6 Claims, 2 Drawing Sheets

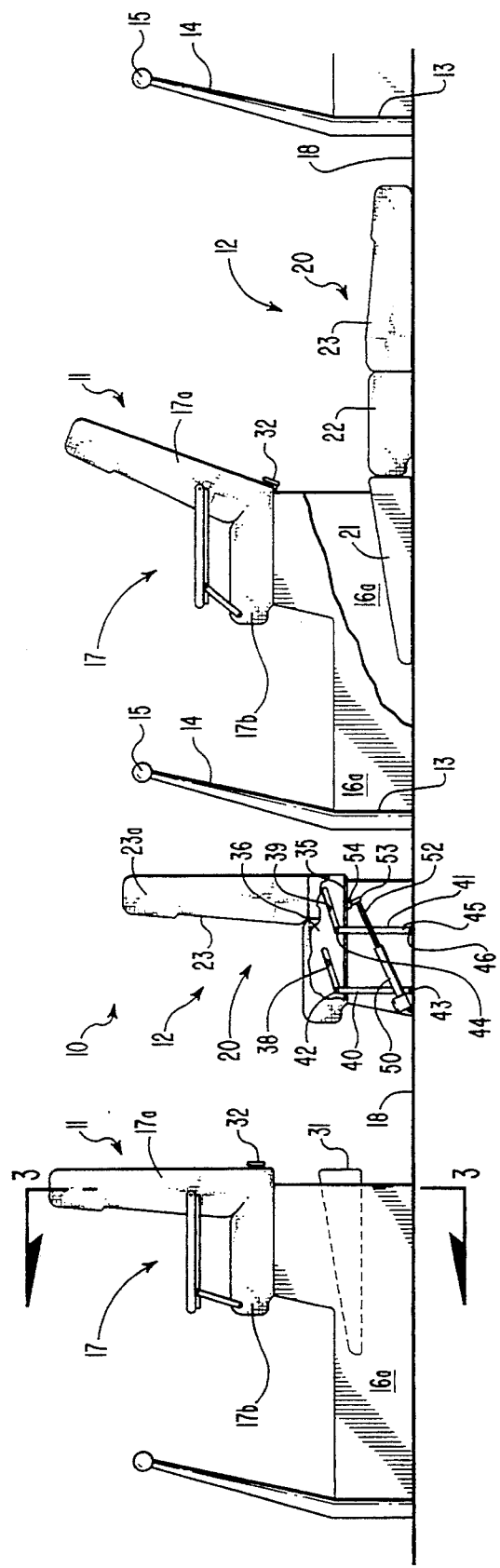
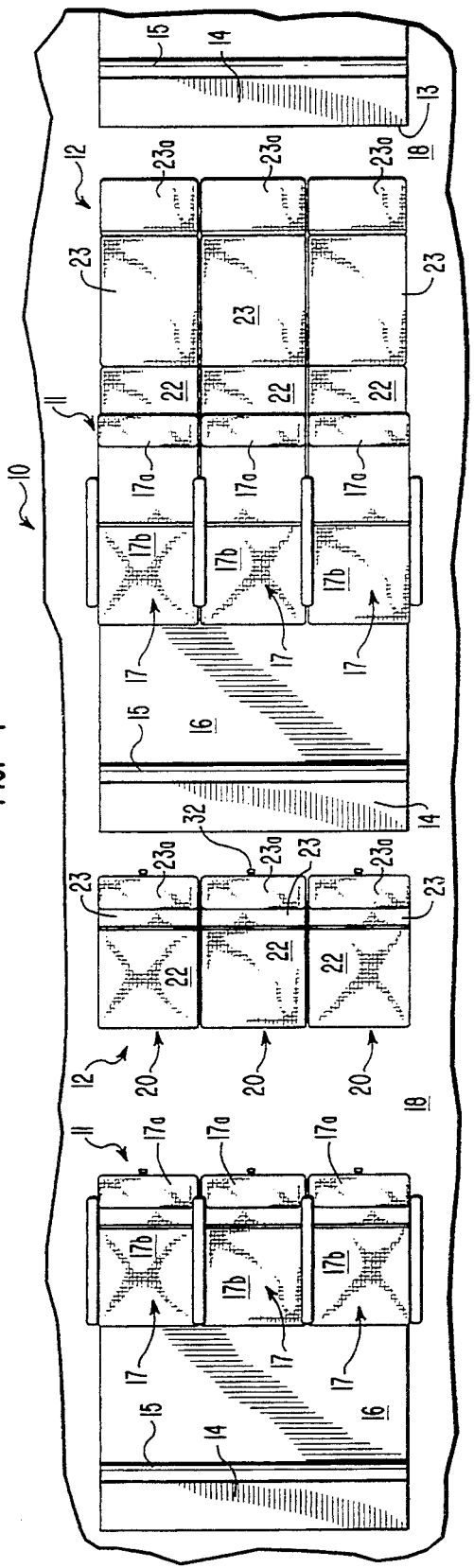

AIRCRAFT PASSENGER ACCOMODATION SYSTEM

BRIEF DESCRIPTION OF THE INVENTION

1. Field of the Invention

The present invention relates to passenger seating in passenger carrying aircraft. It is more particularly concerned with passenger comfort systems wherein passengers are allowed to sit up or to recline, as they choose.

2. Prior Art

It has long been recognized that travel as a passenger on aircraft can become very tiresome. Particularly, on long trips such as overseas aircraft flights, it is difficult for passengers to sleep in a sitting or partially reclined position, and it is highly desirable that they be able to sleep in a fully reclined position. It is recognized, however, that the space available for each passenger aboard an aircraft must be kept to a minimum in order to allow the operators to transport a maximum number of passengers and to realize a satisfactory profit from the transporting of such passengers. It is also recognized that it is important that the seating system for a passenger aircraft be as light in weight as possible, again to insure the transporting of a maximum number of persons in the aircraft, without overloading of the craft.

In the past, a number of sleeping systems have been proposed in the past for vehicles. Many of the systems with which I am familiar have involved the use of sleeping compartments or bed arrangements that greatly reduce the seating space available in the vehicle. Such systems are shown, for example in U.S. Pat. Nos. 1,699,768 and 2,946,294. Other known systems provide limited reclining but do not provide for full reclining of at least some users during travel. U.S. Pat. Nos. 21,251, 2,775,996, and 3,784,989, disclose such structures, for example.

A proposal has been made for stretcher-type supporting structure to mount in airliners either as replacement for the seats usually mounted in the aircraft or above such seats. See U.S. Pat. No. 4,115,884.

U.S. Pat. No. 3,898,704, discloses wall mounted beds for use by flight crew members and U.S. Pat. Nos. 2,124,003 and 2,382,402, show systems where facing seats are used to form lower bunks and upper bunks are mounted to upper side walls of a passenger cabin of an aircraft.

U.S. Pat. No. 4,071,210, discloses a rack-like sleeping apparatus to be used in aircraft in place of the usual seating structure. Couches in the rack provide for users to be in recumbent, but no fully reclined position.

U.S. Pat. No. 3,910,626, discloses a passenger seat structure for use in large, long-haul trucks and wherein the seat will move between an upright seating position and a fully reclined position adjacent the vehicle driver's seat and on the floor of the vehicle.

U.S. Pat. No. 2,608,366, discloses a convertible sleeping chair structure intended for use in passenger aircraft. The patent discloses a system wherein facing chairs are positioned at different levels to provide clearance for persons in the seats when the seats are moved to a fully reclined position.

U.S. Pat. No. 2,775,996, discloses a sleeping chair unit as used in busses, Pullman coaches and the like wherein the units are constructed to have chairs functioning as upright chairs in which an occupant can sit and which are capable of being transformed into a second position in which the occupant can recline. Tandem chairs are provided with the legs of a person in the chair behind moving beneath the seat of the chair ahead as both chairs are moved to a reclining position.

U.S. Pat. No. 2,775,996, does not disclose a passenger accomodation system that will allow fully reclining seat passengers access to and exit from the fully reclined seats without disturbing other passengers when the chairs are in a fully reclined position.

SUMMARY OF THE INVENTION

Is a principal object of the present invention to provide a passenger accommodation system that will allow at least a significant portion of the passengers in an airliner to change from a sitting to a fully reclined position and to do so without disturbing other passengers within the aircraft. Other objects are to provide a system for use in aircraft that will permit only some passengers being transported to fully recline without interfering with the positioning and comfort of other passengers.

Still other objects are to provide a passenger accommodation system that will permit at least some of the passengers to fully recline and that takes up no more space in the vehicle than is required for conventional passenger seating. All passenger, whether partially or fully reclined have their feet extending towards the front of the aircraft to thus be in what has been proven to be the best possible crash position.

Principal features of the invention include the use of alternate sit-up and sleeper rows of seats with the sit-up rows arranged such that passengers in the sleeper rows can achieve a fully reclined position extending beneath the seats positioned directly ahead in a sit-up row.

Other features of the invention include corridors providing access to seats and handrails positioned between adjacent rows such that they can be easily used for support by persons moving into and out of the sit-up and sleeper rows.

Still other features of the invention include elevated partially reclining or tilt-back seats within the sit-up rows and easily operated assemblies within the sleeper row that will convert from reclining seats to beds or lounges having foot portions extending beneath the tilt-back seats of the sit-up row. A handrail bar is provided adjacent to the entrance and exit ways to and from the the tilt-back seats of the sit-up row and the entrance way to and from the beds of each sleeper row.

Additional objects and features will become apparent to those skilled in the art to which the invention pertains from the following detailed description and claims, taken with the accompanying drawings.

THE DRAWINGS

In the drawings:

FIG. 1 is a side elevation view of a passenger accomodation system of the invention;

FIG. 2 is a top plan view;

DETAILED DESCRIPTION

Figure 3:
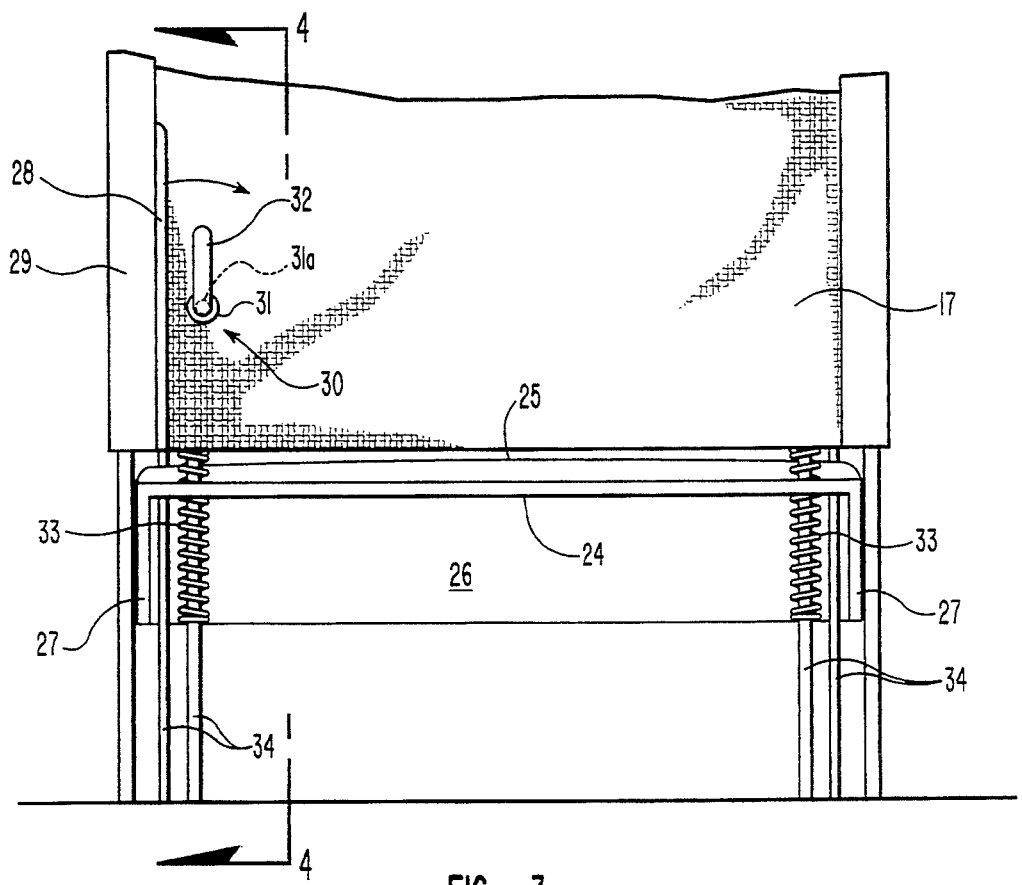
FIG. 3 is a rear elevation view of a seat on a sit-up row of the passenger accomodation system.

Referring now to the drawings:

In the illustrated preferred embodiment the passenger accomodation system for aircraft of the invention is shown generally at 10 and includes at least one reclining seat assembly 11 and at least on lay-down seat assembly 12.

The reclining seat assembly 11 includes a partition 13 angled near its upper end 14 to terminate at its upper end in a handrail 15. A raised platform 16 extends from a lower part of the partition 13 and is supported by spaced part walls 16a.

A reclining passenger seat 17, for example, of the type used presently in commercial passenger airlines is mounted on the platform 16. The seat 17, as is well known, has a back 17a that pivots with respect to a bottom seat 17b between a position wherein an occupant of the chair is sitting upright or is partially reclined.

The raised platform 16 is spaced about eight to ten inches above the floor 18 of the aircraft to provide space for a portion of a supporting bed and legs of an occupant of the lay-down section, as will be further explained.

It will be apparent that a user of the reclining seat assembly will step onto or off the raised platform and will use the handrail 15 in moving into and out of the seat 17.

The lay-down seat assembly 12 includes a lounge seat 20 that will provide normal upright seating for an occupant having his feet on the aircraft floor and that can be readily lowered and moved to provide a lounge or bed for the occupant. In the lowered position, the lounge seat 20 is spaced away from the partition 16 of the reclining seat assembly behind by approximately eight to ten inches, and the occupant is able to fully recline with his feet and lower legs spaced beneath the platform 16 of the reclining seat ahead.

While the lounge seat 20 may include a foot portion to extend beneath the platform 16 ahead when moved to its lowered position, it is presently preferred that a separate bolster 21 be lowered from beneath the platform 16 ahead to cooperate with the lowered seat support 22 of the lounge seat 20 and a fully reclined seat back 23 of the lounge seat 20.

Figure 4:
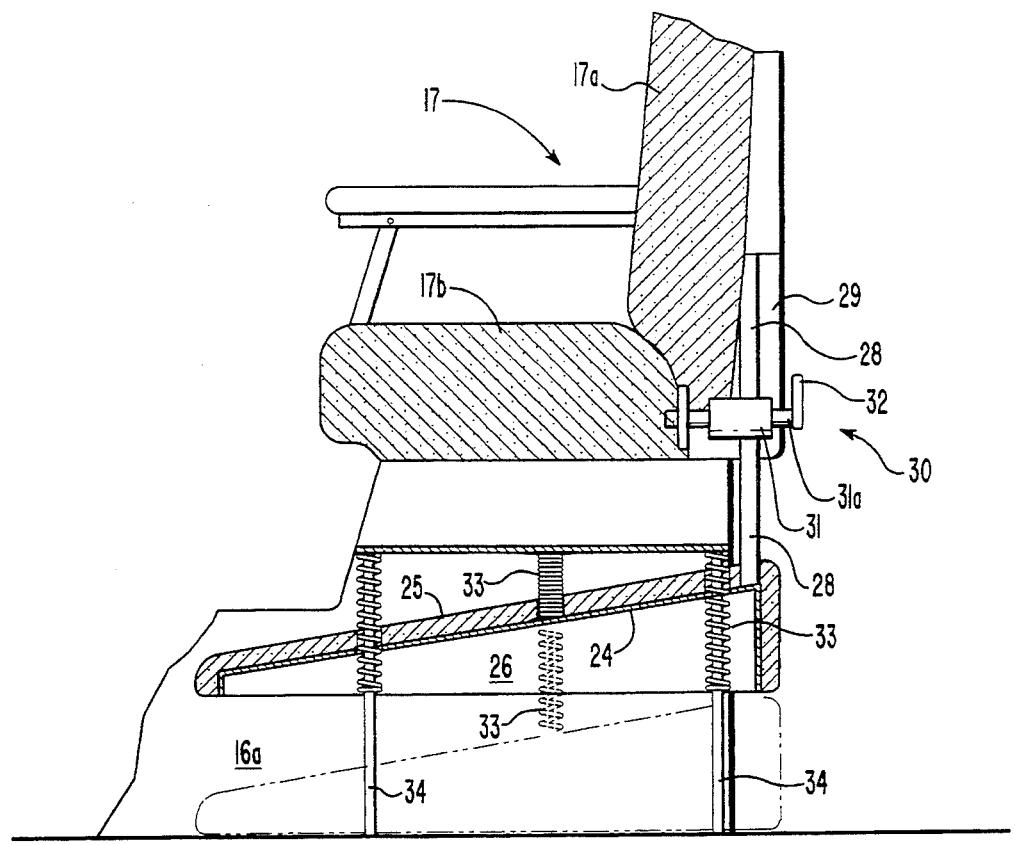
FIG. 4 is a vertical section taken on the line 4—4 of FIG. 3.

As shown best in FIG. 4, a bolster 21 includes an inclined platform 24 with padding 25 thereon on an upper surface. The platform has side walls 26 and 27 projecting downwardly therefrom and a guide member 28 extending upwardly into the back seat 17a. A guide member extends between a solid seat back frame member 29 and a cam lock 30. The cam lock includes a circular member 31 rotatable about an eccentric pin 31a that is turned by a handle 32 forming a continuation of the pin and projecting from the seat back.

Springs 33 at opposite sides of the inclined platform 24 each have one end fixed to the bottom seat 17b and the other end fixed to the platform 24. In addition, guide rods 34 extend from the seat bottom 17b to the floor of the aircraft cabin and through guide holes 35 provided at each corner of platform 24 to guide the bolster in its up and down movement.

The bolster is pushed down against the bias of springs 33 until the side walls 26 and 27 rest on the aircraft cabin floor, at which time the forward edge of the inclined platform is closely adjacent the floor and the rear edge of the platform is spaced from the floor to be aligned with the support 22 when the lounge seat 20 is in a lowered position, as will be hereinafter described.

Before the bolster 21 is lowered, cam lock 30 is operated to release guide member 28. The user then lowers the bolster by pushing it down against the bias of springs 33, and when the bolster is fully down the cam lock 30 is operated to such that circular member 31 will grip the guide member against member 29 to hold the bolster in its lowered position. When it is desired to raise the bolster, cam lock 30 is again operated to release guide member 28, and the springs 33 are allowed to bias the bolster back to its raised position.

The seat back 23 of the lounge seat 20 is conventionally mounted to the seat support 22 to be moved between an upright position and selected reclining positions. Such arrangements are well known, being found on commercial aircraft, for example, and will not be discussed in detail.

The seat support 22 includes a seat platform 35 and depending side plates 36 at opposite sides thereof. Each of the side plates has a pair of slots 38 and 39 therein. Support arms 40 and 41 at opposite sides of the seat form a parallelogram linkage with one end 42 of each arm 40 being mounted to slide in a slot 38. The other end of each arm 40 is then pivotally secured at 43 to the floor of the passenger cabin of the aircraft. In similar fashion, each arm 41 has one end 44 mounted to slide in a slot 39 and its other end 45 pivotally mounted at 46 to a floor of the passenger cabin of the aircraft.

A reversible electric motor 50 is pivotally mounted at 51 to the passenger cabin floor and an output shaft 52 of the motor has a worm thread thereon. The shaft 52 is threaded into a nut 53 that is centrally carried by an arm 54 depending from the bottom of the seat support.

In operation, when the motor 50 is operated to turn the shaft 52 in one direction the nut 53 is moved by the worm thread outwardly along the shaft, thus pivoting the arms 40 and 41 to raise the seat support 22 with the arms moving to extreme ends of the slots 38 and 39. Reversal of the motor 50 and output shaft 52 will move the nut 53 inwardly toward the motor. This pivots the arms 40 and 41 to lower the seat support 22 and slides the arms to the other extremes of slots 38 and 39 to move the seat support towards the reclining seat assembly 11. In its fully lowered and forward position, FIG. 1, the seat support 22 will be closely contiguous to the bolster 21 when the bolster is in its lowermost position, as previously described. In this position, also, the seat back 23 may be fully reclined so that a bed or lounge is formed by the bolster 21, the seat support 22 and the back seat 23 on which a person may fully recline.

With the seat support 22 in its full lowered and forward position, and with the seat back 23 fully reclined, the head support end 23a of the seat back is spaced sufficiently from the partition 13 of the reclining seat assembly 11 behind to permit a person to walk between the seat back and the partition while holding onto rail 15. Because the partition 13 is angled at its upper end 14 to terminate in the rail 15, the hips and upper body of a person walking between the seat back 23 and partition 13 will be sufficient clearance even though the space between the seat back and partition is only slightly more than is sufficient to allow feet to clear.

It will be apparent that a plurality of reclining seat assemblies 11 may be provided in a side-by-side relationship to make a row of such assemblies. Similarly, a plurality of lay-down seat assemblies 12 may be placed in side-by-side relationship to make a row of lay-down seat assemblies. When the reclining and lay-down seat assemblies are installed in a vehicle, they are alternately placed and take up little, if any, more room than do presently existing conventional seating system that do not provide for full reclining of at least some passengers.

With the passenger accomodation system of the invention, commercial vehicle operators can sell tickets for the full lay down seats at a higher price than can be obtained for the reclining seats. In aircraft, for example, different fares can be charged depending on the number of lay-down seats in a row. No basic alteration is required of the aircraft in which the passenger accomodation system of the invention is used, and the number of passengers that can be carried does not change significantly, if at all.

Aircraft fitted with the passenger accomodation system can be used as commercial passenger airliners and can as easily be used as military hospital planes for transporting patients who must be in a prone position as well as patients having somewhat more mobility.

Although a preferred form of my invention has been herrein disclosed, it is to be understood that the present disclosure is by way of example and that variations are possible without departing from the subject matter coming within the scope of the following claims, which subject matter I regard as my invention.

I claim:

1. A passenger accomodation unit comprising
    a plurality of side by side and aligned front to rear elevated partially reclining seat assemblies facing in a first direction and each having a space therbeneath;
    a lay-down seat assembly arranged to face in said first direction and positioned behind each elevated reclining seat assembly and including a lounge seat with a support seat, and a fully reclining seat back pivotally connected to said support seat;
    means for moving each said support seat down and in said first direction towards the elevated partially reclining seat assembly aligned therewith, whereby a person on the lounge seat may be supported in a substantially fully reclined position, with his legs extending into the space beneath the elevated recling seat assembly, by the support seat and the reclining back seat; and
    corridor means providing a walkway extending between each fully reclined back of each said side by side lay-down seat assembly and aligned, elevated, partially reclining, side by side seats therebehind.

2. A passenger accomodation unit as in claim 1, further including
    partition means separating said corridor means and the elevated reclining seat behind.

3. A passenger accomodation unit as in claim 2, wherein said partition has a handrail on an upper edge thereof.

4. A passenger accomodation unit as in claim 3, wherein said partition extends upwardly and is angled rearwardly towards said elevated reclining seat behind and away from the lay-down seat assembly to terminate in said handrail.

5. A passenger accommodation system as in claim 4, wherein:
    means in the space beneath the elevated reclining seat assembly forms an extension of the support seat when the support seat is moved fully down and towards the reclining seat assembly.

6. A passenger accomodation unit as in claim 5, wherein the means in the space beneath the elevated reclining seat forming an extension comprises a bolster, movable between a raised position against the elevated reclining seat and a lowered position forming a continuation of the support seat.

* * * * *